No. 779,833.

Patented January 10, 1905.

UNITED STATES PATENT OFFICE.

MAYLEAN BJORNSTAD AND JOSEPH STACEY, OF AUCKLAND, NEW ZEALAND.

MEDICATED SWEETMEAT.

SPECIFICATION forming part of Letters Patent No. 779,833, dated January 10, 1905.

Application filed February 17, 1903. Serial No. 143,860. (Specimens.)

*To all whom it may concern:*

Be it known that we, MAYLEAN BJORNSTAD, residing at College road, and JOSEPH STACEY, residing at Mount street, in the Provincial District of Auckland and Colony of New Zealand, subjects of His Majesty the King of the United Kingdom of Great Britain and Ireland, have invented a certain new and useful medicated sweetmeat and sugar confection for the cure and relief of consumption, bronchitis, asthma, and other pulmonary, chest, and throat diseases, of which the following is a specification.

This invention relates to medicated sweetmeats and sugar confections, and has for its principal object to provide a vehicle for administering beechwood creosote in the most pleasant and effective manner for the relief and cure of consumption, bronchitis, asthma, and other pulmonary, chest, and throat diseases.

It is well known that beechwood creosote is a disagreeable drug. For this reason it has generally been administered heretofore by means of capsules and the like; but this method is unsatisfactory on account of the fact that after the capsule is dissolved the patient frequently is nauseated and the beneficial action of the drug is retarded. Furthermore, even if the patient is not nauseated the action of the drug is slow and often feeble, because it can act upon the lungs and throat only indirectly—that is, by being assimilated into the blood. Another method of administering the drug is by inhalation; but this method is unsatisfactory and feeble, because it acts on the diseased portions only through the medium of the breath and does not secure the coöperation of the blood.

By means of the present invention the disagreeable taste of the drug is neutralized and nauseation of the patient is thereby prevented. Furthermore, the drug is administered in such form that it is simultaneously carried into the lungs by the breath, supplied to the throat by being dissolved in saliva, and finally fed to the stomach, where it is assimilated into the blood, and thereby permitted to act upon the diseased tissues of the body. It will therefore be apparent that by means of the present invention all the disadvantages of the old methods of administering beechwood creosote are avoided, while all their advantages are combined with other advantages peculiar to the present invention, as will be apparent from the following description.

The creosote is administered according to this invention in the form of a sweetmeat or confection which is to be dissolved in the mouth of the patient, whereby the creosote is carried into the lungs by the breath, supplied to the throat by the saliva, and finally fed to the stomach, from which it is assimilated into the blood.

In making the sweetmeat and sugar confection which will be most used the following ingredients are used in the proportions given: sugar, one pound avoirdupois; extract of malt, four ounces; two ounces of butter; cream of tartar, two grains, (or vinegar, two ounces,) and beechwood creosote, from one hundred and forty to two hundred and eighty minim drops. These ingredients are usually made into what are known in the confectionery trade as "tablets," and when so made the sugar in each is boiled to a proper consistency and the different parts are mixed in the usual way, except the beechwood creosote, which is added last while the whole mixture is boiling or is still hot. The mixture is then molded into the desired shapes and allowed to cool.

The tablets are usually made in the number of about one hundred and forty to the pound weight of sugar used, and when so made the one hundred and forty minim drops of creosote will give one drop to each tablet or other form as produced. This proportion will suit the average patient or sufferer; but for aggravated and serious cases the proportion of creosote per pound of sugar used in making the sweetmeat or confection may be increased, as before stated, so as to give an additional half drop or full drop, or even more to each tablet or other shape.

The beechwood creosote may also be added to any form of confectionery suitable for medication.

The proportions herein given may be slightly varied, either more or less, without injury to the combination.

All weights are in avoirdupois, and all ingredients are the best and purest.

Having fully described our invention, what we desire to claim and secure by Letters Patent is—

1. As a new article of manufacture, a medicated confection in the form of a tablet slowly soluble in saliva, consisting of two ounces of malt, two ounces of butter, two grains of cream of tartar, sixteen ounces of sugar and from one hundred and forty to two hundred and eighty minim drops of beechwood creosote.

2. As a new article of manufacture, a medicated confection in the form of a tablet slowly soluble in saliva, consisting of malt, butter, cream of tartar, sugar and beechwood creosote.

MAYLEAN BJORNSTAD.
JOSEPH STACEY.

Witnesses:
GEORGE WILLIAM BASLEY,
PERCY HERBERT BASLEY.